(12) United States Patent
Bastami (10) Patent No.: US 9,673,638 B2
(45) Date of Patent: Jun. 6, 2017

(54) APPARATUS AND METHOD FOR A SWITCHING POWER CONVERTER

(75) Inventor: Siamak Bastami, Gilroy, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 402 days.

(21) Appl. No.: 13/247,654

(22) Filed: Sep. 28, 2011

(65) Prior Publication Data

US 2013/0076301 A1    Mar. 28, 2013

(51) Int. Cl.
    *H02J 7/00*    (2006.01)
(52) U.S. Cl.
    CPC ................... *H02J 7/0008* (2013.01)
(58) Field of Classification Search
    CPC ................. H02J 7/025; H02J 7/0042
    USPC .......................................... 320/107
    See application file for complete search history.

(56) References Cited

U.S. PATENT DOCUMENTS

| | | | | |
|---|---|---|---|---|
| 6,636,431 B2 * | 10/2003 | Seki et al. | ...................... | 363/65 |
| 7,777,459 B2 * | 8/2010 | Williams | ...................... | 323/266 |
| 2009/0015229 A1 * | 1/2009 | Kotikalapoodi | .............. | 323/285 |
| 2009/0072779 A1 * | 3/2009 | Kuhlmann | ..................... | 320/101 |
| 2009/0189571 A1 * | 7/2009 | Lai et al. | ....................... | 320/162 |
| 2010/0194344 A1 * | 8/2010 | Greyling | ....................... | 320/128 |
| 2010/0237840 A1 * | 9/2010 | Walter et al. | ................. | 323/282 |
| 2011/0254377 A1 * | 10/2011 | Wildmer et al. | .............. | 307/104 |

OTHER PUBLICATIONS

Day et al. "Power Management Choose the Best Buck-Boost Converter", EE Times-Asia, Mar. 16-31, 2007, eetasia.com, pp. 1-3.

* cited by examiner

*Primary Examiner* — Drew A Dunn
*Assistant Examiner* — Jerry D Robbins
(74) *Attorney, Agent, or Firm* — Haynes & Boone LLP.

(57) ABSTRACT

A charging converter includes a plurality of switches configured to switchably operate to either step up an input voltage or step down the input voltage and generate a charging voltage on a second terminal to charge to a rechargeable storage unit, and control logic configured to operate the plurality of switches in one of a step up mode and a step down mode based on a determination of a voltage level of the input voltage relative to the desired charging voltage. A method includes determining a desired charging voltage to charge a rechargeable storage unit, switchably controlling a charging converter to step up the input voltage if an input voltage is lower than the desired charging voltage to generate a charging voltage, and switchably controlling the charging converter to step down the input voltage if the input voltage is higher than the desired charging voltage to generate the charging voltage.

22 Claims, 9 Drawing Sheets

APPARATUS AND METHOD FOR A SWITCHING POWER CONVERTER

TECHNICAL FIELD

Embodiments of the present disclosure relate generally to power converters and, more particularly, to apparatuses and methods related to power converters used to charge rechargeable storage units of electronic devices and power internal system components thereof.

BACKGROUND

Portable electronic devices include rechargeable storage units, such as batteries, to provide power to internal system components. Through use of the portable electronic device, the battery is discharged. As a result, the battery may require charging from a power source to extend the operation of the portable electronic device. Many portable electronic devices may receive input power from the power source through a variety of different methods. For example, the portable electronic device may be coupled to an DC power source through an AC/DC adaptor. The portable electronic device may also be coupled to power sources through other methods, such as a universal serial bus (USB) connection.

The voltage range from various power sources may vary. For example, a USB input voltage range may range from 4.35 V to 5.5 V. An AC/DC adaptor may have various input voltages (e.g., 10 V, 15 V, 20 V) depending on the configurations of the specific AC/DC adaptor. In addition, the batteries used to power the portable electronic devices may have a variety of different voltage requirements for charging the batteries. As a result, charging the batteries and powering the internal system components during charging may require a relatively complex network of power converters to achieve the desired voltages.

BRIEF SUMMARY

Embodiments of the present invention include a charging converter. The charging converter comprises a first terminal configured to receive an input voltage. The charging converter further comprises a plurality of switches configured to switchably operate to either step up the input voltage or step down the input voltage and generate a charging voltage on a second terminal to charge a rechargeable storage unit. The charging converter further comprises control logic configured to operate the plurality of switches in one of a step up mode and a step down mode based, at least in part, on a determination of a voltage level of the input voltage relative to the desired charging voltage.

Another embodiment of the present disclosure includes an electronic device. The electronic device comprises a charging converter coupled in a current path from a first terminal to a second terminal providing power from a power source to a rechargeable storage unit. The electronic device further comprises a system power converter coupled in a current path from the second terminal to a third terminal providing power to internal system components of the electronic device. The electronic device further comprises control logic configured to control the charging converter to switchably operate in a plurality of different modes in response to a determination of a voltage from the power source relative to a desired charging voltage for the rechargeable storage unit.

In yet another embodiment of the present invention, a method for charging a rechargeable storage unit of an electronic device is disclosed. The method comprises receiving an input voltage provided by a power source, determining a desired charging voltage to charge a rechargeable storage unit, switchably controlling a charging converter to step up the input voltage if the input voltage is lower than the desired charging voltage to generate a charging voltage, and switchably controlling the charging converter to step down the input voltage if the input voltage is higher than the desired charging voltage to generate the charging voltage.

DETAILED DESCRIPTION

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Figure 1:
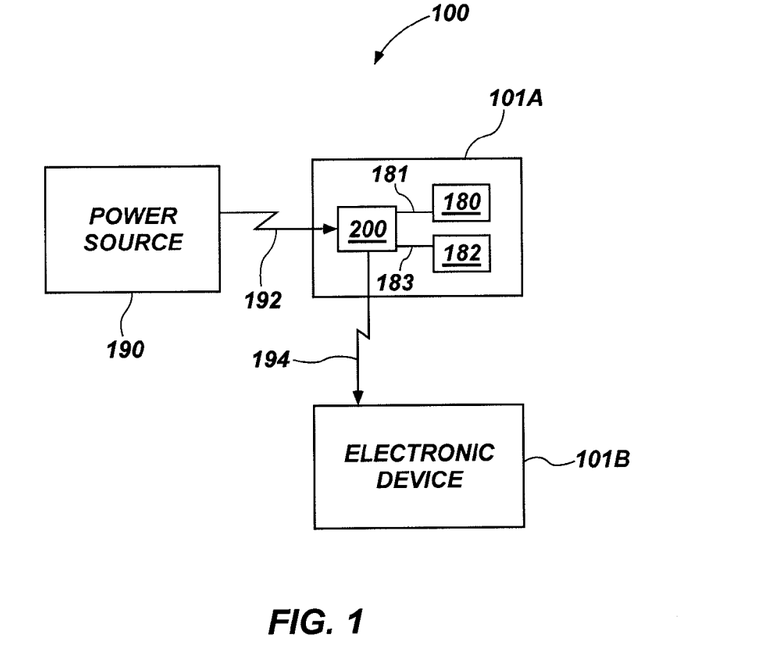
FIG. 1 is a charging system according to an embodiment of the present disclosure.

FIG. 1 is a charging system 100 according to an embodiment of the present disclosure. The charging system 100 includes a first electronic device 101A, a second electronic device 101B, and a power source 190. The first electronic device 101A and the second electronic device 101B may be a portable electronic device, such as a laptop, notebook, tablet, electronic reader, cellular phone, smart phone, personal digital assistant, media player, or another electronic device. Such electronic devices include a rechargeable storage unit (e.g., a battery) that powers the electronic device. For example, the first electronic device 101A may include a rechargeable storage unit 180 that is operably coupled and configured to power internal system components 182 (e.g., processor, display, memory, etc.) of the first electronic device 101A. The first electronic device 101A may further include a power converter 200 coupled to the rechargeable storage unit 180 and the internal system components 182. Although only the first electronic device 101A is described with further detail herein, the second electronic device 101B may be similarly configured.

During operation of the first electronic device 101A, the rechargeable storage unit 180 may power the internal system components 182, during which the rechargeable storage unit 180 may lose charge such that recharging may be required. The first electronic device 101A may be coupled to the power source 190, which provides a power signal 192 to the first electronic device 101A to charge the rechargeable storage unit 180. During recharge, the internal system components 182 of the first electronic device 101A may be powered by the power source 190, the rechargeable storage unit 180, or a combination thereof.

The power source 190 may be an alternating current (AC) power outlet (e.g., through an adaptor), another electronic device (e.g., personal computer, notebook, etc.), a battery, or another power source that has sufficient power requirements to charge at least a portion of the rechargeable storage unit 180. Thus, the power source 190 and the first electronic device 101A may have a wired connection (e.g., through an adaptor, universal serial bus (USB) connector, etc.) to facilitate charging of the first electronic device 101A. Some embodiments may include a wireless power charger that may wirelessly couple and provide power signal 192 to the first electronic device 101A. For example, the power source 190 may include a transmitting coil, and the first electronic device 101A may include a receiving coil that couple through inductive coupling to generate the power signal 192 provided to the power converter 200. As will be described herein, the first electronic device 101A may be configured to provide a power signal 194 to the second electronic device 101B, such that the first electronic device 101A may be considered the power source to the second electronic device 101B. For example, the first electronic device 101A may be a first smart phone that charges a second smart phone. Although the power source 190 and the second electronic device 101B are shown in FIG. 1 as both being coupled to the first electronic device 101A at the same time, such simultaneous coupling is not required. In other words, the first electronic device 101A may provide the power signal 194 to the second electronic device 101B independent of receiving the power signal 192 from the power source 190.

The voltage requirements to charge the rechargeable storage unit 180 may have a different voltage level than the voltage level used to power the internal system components 182. In other words, a first voltage 181 needed to power the charging of the rechargeable storage unit 180 may be different than a second voltage 183 needed to power the operation of the internal system components 182. For example, single cell lithium ion batteries may require 4.25 V at full charge, while the internal system components 182 may have standard operating voltages of 3.3 V. In embodiments in which the rechargeable storage unit 180 includes a double cell lithium ion battery, the full charge voltage may be 8.5 V. Higher level multi-cell lithium ion batteries may require even higher voltages for charging. Such voltages are used herein as examples, and individual requirements may depend on the configuration and storage capacity of individual batteries. Additional configurations are contemplated for the rechargeable storage unit 180, including those that are not limited to lithium ion batteries.

The first voltage 181 and the second voltage 183 may also be different than the voltage of the power signal 192 received from the power source 190. As a result, the power converter 200 is configured to generate a plurality of different voltages from the power signal 192. For example, the power converter 200 may need to step up the voltage of the power signal 192 to generate the first voltage 181, and step down the voltage of the power signal 192 to generate the second voltage 183. Because of the different types of power sources that may provide the power signal 192, the power converter 200 may be needed to step up the voltage of the power signal 192 in some situations, and step down the voltage of the power signal 192 in other situations. In some embodiments, the power converter 200 may be configured to switchably step up or step down the power signal 192 in response to a determination of the requirements of the rechargeable storage unit 180 and the voltage of the power signal 192. The power converter 200 may further be configured to switchably step up or step down voltage signals that are used to generate the second voltage 183 provided to the internal system components 182. The power converter 200 may further be configured to switchably step up or step down voltage signals that are used to generate the power signal 194 that is provided to the second electronic device 101B. In additional embodiments, the power converter may be configured to operate in a protection mode that opens current paths to protect the first electronic device 101A in the event of a short therein.

Figure 2A:
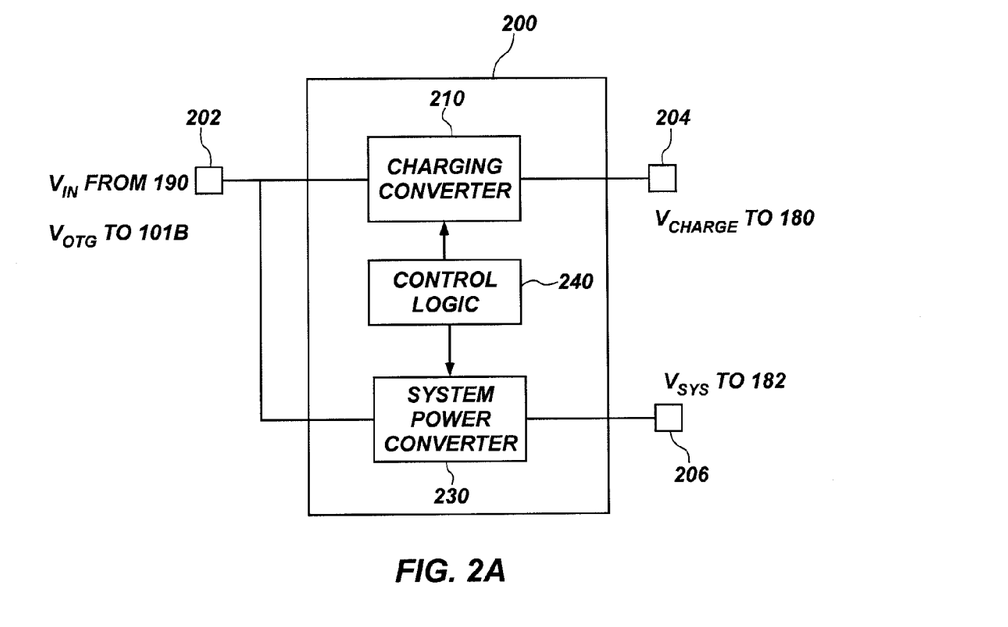
FIG. 2A is a schematic block diagram architecture of the power converter of FIG. 1 according to an embodiment of the present disclosure.

FIG. 2A is a schematic block diagram architecture of the power converter 200 of FIG. 1 according to an embodiment of the present disclosure. The power converter 200 includes a charging converter 210, a system power converter 230, and control logic 240. The power converter 200 may include a plurality of terminals 202, 204, 206, that couple with other components to provide power to and from the power converter 200 as controlled by the control logic 240.

A first terminal 202 may be coupled with the power source 190, the second terminal 204 may be coupled with the rechargeable storage unit 180, and a third terminal 206 may be coupled with the internal system components 182 of the first electronic device 101A (FIG. 1). The first terminal 202 may also couple with the second electronic device 101B (FIG. 1). FIG. 1 may appear to indicate that the power source 190 and the second electronic device 101B couple with the power converter 200 at different terminals; however, that is not necessarily the case. As shown in FIG. 2A, the power source 190 and the second electronic device 101B may couple to the same terminal, such as the first terminal 202. For example, the first terminal 202 may interface with external devices through an external port, such as a universal serial bus (USB) port or other port that may support power transfer between devices. Of course, embodiments should not be viewed as limited to a certain number of terminals or ports. For example, the first electronic device 101A may include a plurality of USB ports, such that the power source 190 and the second electronic device 101B may be coupled to the first electronic device 101A simultaneously.

While the term "terminal" is used, terminal should not be interpreted as requiring a specific termination connector or pad. The term "terminal" is merely used as a way of defining the boundaries between components. A terminal may be as simple as a node that couples two elements. For example, as shown in FIG. 1, the rechargeable storage unit 180 and the internal system components 182 may be located within the form factor of the first electronic device 101A, such that the second terminal 204 and third terminal 206 may be internal terminals that interface with internal components of the first electronic device 101A.

The charging converter 210 is coupled in a path between the first terminal 202 and the second terminal 204. As a result, the charging converter 210 is configured to generate the charging voltage $V_{CHARGE}$ to charge the rechargeable storage unit 180. Depending on the input voltage $V_{IN}$ applied at the first terminal 202, the control logic 240 is configured to operate the charging converter 210 in either a step-up mode or a step-down mode. For example, if the input voltage $V_{IN}$ is less than the desired voltage for a fully charged rechargeable storage unit 180, the charging converter 210 operates in the step-up mode. If, however, the input voltage $V_{IN}$ is greater than the desired voltage for a fully charged rechargeable storage unit 180, the charging converter 210 operates in the step-down mode.

The system power converter 230 is coupled in a path between the first terminal 202 and the third terminal 206. As a result, the system power converter 230 is configured to generate the system voltage $V_{SYS}$ to power the internal system components 182 of the first electronic device 101A. In some embodiments, the system power converter 230 may be coupled to an input of the charging converter 210, such as at the first terminal 202. For example, the input line to the system power converter 230 may be coupled to the first terminal 202. In other words, the charging converter 210 and the system power converter 230 may be coupled in parallel.

The power converter 200 may be configured to facilitate providing power from the external power source 190 in order to charge the rechargeable storage unit 180 of the electronic device 101A. The power converter 200 may further facilitate providing power from the external power source 190 to the internal system components 182 of the first electronic device 101A. In some embodiments, the power converter 200 may be configured to facilitate providing power from the rechargeable storage unit 180 to the second electronic device 101B.

Figure 2B:
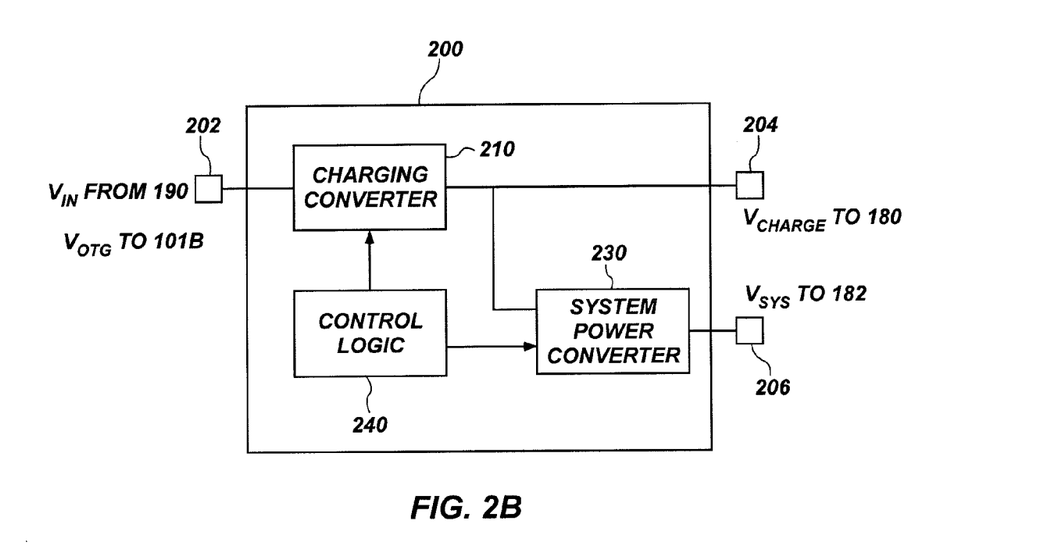
FIG. 2B is a schematic block diagram architecture of the power converter of FIG. 1 according to another embodiment of the present disclosure.

FIG. 2B is a schematic block diagram architecture of the power converter 200 of FIG. 1 according to another embodiment of the present disclosure. In some embodiments, the system power converter 230 may be coupled to an output of the charging converter 210. For example, the input line to the system power converter 230 may be coupled to the node between the charging converter 210 and the rechargeable storage unit 180. In other words, the charging converter 210 and the system power converter 230 may be coupled in series.

In operation, the charging converter 210 operates similarly as before in switchably stepping up or stepping down the input voltage $V_{IN}$ to generate the charging voltage $V_{CHARGE}$ to the rechargeable storage unit 180. The system power converter 230 operates similarly, as previously discussed, in switchably stepping up or stepping down a voltage to generate the system voltage $V_{SYS}$ to the internal system components 182. In FIG. 2B, the voltage received by the system power converter 230 is the charging voltage $V_{CHARGE}$. In some situations, the charging converter 210 is configured to switchably step up or step down a voltage received from the rechargeable storage unit 180 to provide power from the rechargeable storage unit 180 to the second electronic device 101B.

Figure 3A:
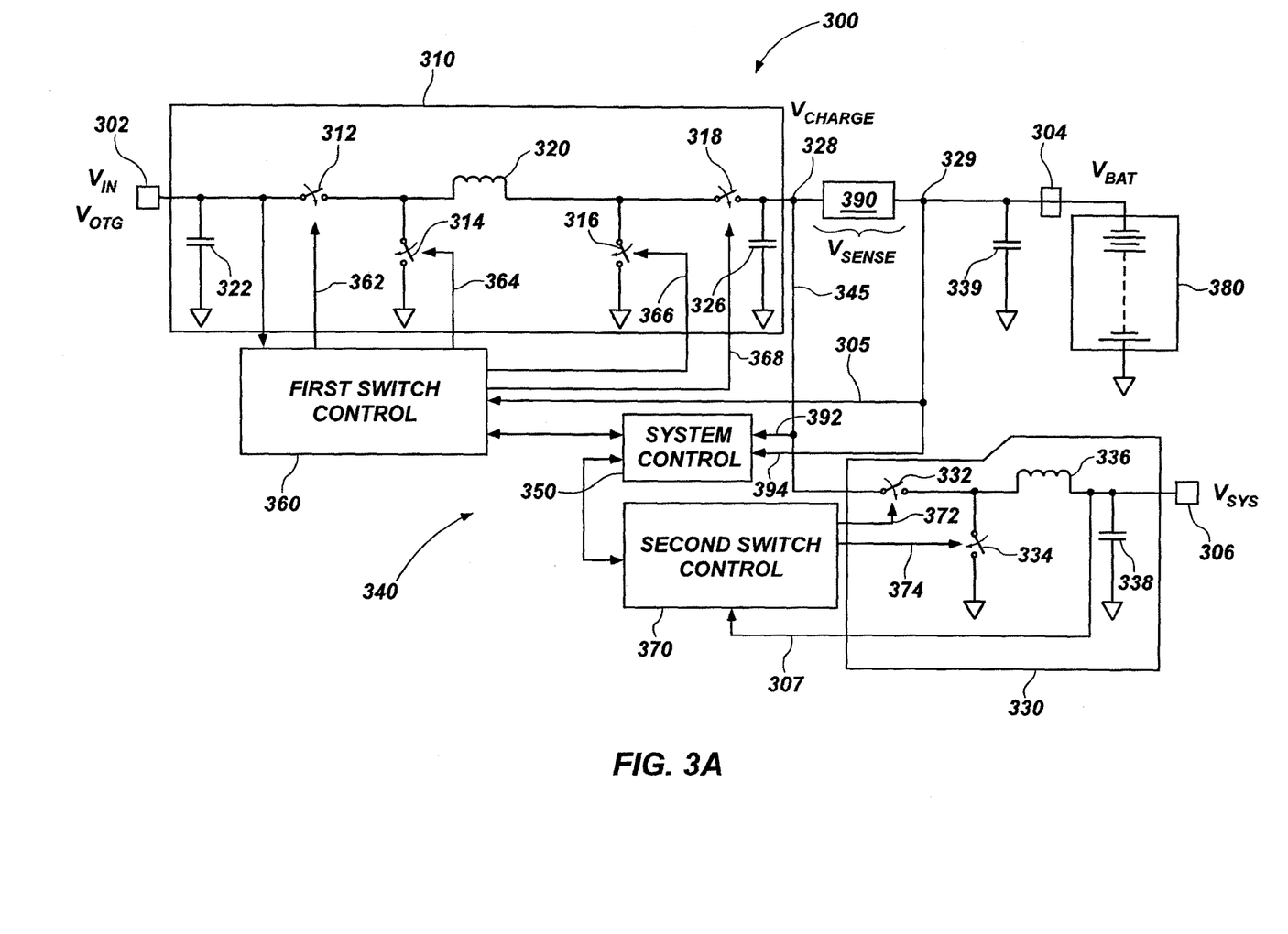
FIGS. 3A through 3G are schematic diagrams of a power converter according to an embodiment of the present disclosure.

FIGS. 3A through 3G are schematic diagrams of a power converter 300 according to an embodiment of the present disclosure. In particular, FIG. 3A shows an embodiment of the general architecture of the power converter 300, and FIGS. 3B through 3G illustrate the operation of the power converter 300 for various situations.

The power converter 300 includes a charging converter 310, a system power converter 330, and control logic 340. The power converter 300 includes a plurality of terminals 302, 304, 306. The first terminal 302 may be configured to couple the power converter 300 with external devices, such as a power source 190 (FIG. 1) to receive power, or a second electronic device 101B (FIG. 1) to provide power to the second electronic device 101B. The voltage at the first terminal 302 may be referred to as the input voltage $V_{IN}$ when receiving power from an external device. The voltage at the terminal 302 may be referred to as the on-the-go (OTG) voltage $V_{OTG}$ when providing power to an external device. OTG mode will further be described below with reference to FIGS. 3E and 3F.

The second terminal 304 and the third terminal 306 may be coupled to internal components of the first electronic device 101A (FIG. 1). For example, the second terminal 304 may be coupled to a rechargeable storage unit 380, and the third terminal 306 may be coupled to internal system components 182 (FIG. 1) of the first electronic device 101A. The voltage at the second terminal 304 may be referred to as the charging voltage $V_{CHARGE}$, and the voltage at the third terminal 306 may be referred to as the system voltage $V_{SYS}$. The power converter 300, the rechargeable storage unit 180, and the internal system components 182 may be formed within the same form factor of the first electronic device 101A. In some embodiments, the rechargeable storage unit 180 may be detachable from the first electronic device 101A such that the rechargeable storage unit 180 may have connectors that couple with the second terminal 304.

The control logic 340 may include system control 350, first switch control 360, and second switch control 370. The system control 350 is configured to coordinate and control each of the first control 360 and the second switch control 370. The first switch control 360 is configured to control the charging converter 310. The second switch control 370 is configured to control the system power converter 330. The control logic 340 may be configured as discrete elements as shown; however, each of the blocks of the control logic 340 may be configured as a single element that is configured to perform each of the described functions. For example, the control logic 340 may be implemented as a processor.

The charging converter 310 may be coupled in a path between the first terminal 302 and the second terminal 304. As a result, the charging converter 310 can be configured to generate the charging voltage $V_{CHARGE}$ to charge the rechargeable storage unit 380. Depending on the input voltage $V_{IN}$ applied at the input terminal 302, the first switch control 360 can be configured to operate the charging converter 310 in either a step-up mode or a step-down mode. For example, if the input voltage $V_{IN}$ is less than the desired voltage for a fully charged rechargeable storage unit 380, the charging converter 310 operates in the step-up mode. If, however, the input voltage $V_{IN}$ is greater than the desired voltage for a fully charged rechargeable storage unit 380, the charging converter 310 operates in the step-down mode.

The charging converter 310 is configured to step up a voltage or step down the voltage in response to the control logic 340. The charging converter 310 includes a plurality of circuit elements that are configured to operate as a switchable step-up/step-down converter, which may be configured to perform either a boost function or a buck function in response to the voltage level received.

In some embodiments, the charging converter 310 includes a plurality of switches 312, 314, 316, 318 (referred to individually as a first switch 312, a second switch 314, a third switch 316, and a fourth switch 318). Each of the plurality of switches 312, 314, 316, 318 may be a transistor, such as a MOSFET, BJT, IGBT, or other device configured as a switch that is controllable by a control signal. The charging converter 310 further includes a first inductor 320, and a plurality of capacitors 322, 326 (referred to individually as a first capacitor 322 and a second capacitor 326).

The first switch 312, the second switch 314, the first inductor 320, and the second capacitor 326 are configured in a buck configuration. The first inductor 320, the third switch 316, the fourth switch 318, and the second capacitor 326 are configured in a boost configuration. In OTG mode, the fourth switch 318, the third switch 316, the first inductor 320, and the first capacitor 322 are configured in a buck configuration. Also, in OTG mode, the first inductor 320, the second switch 314, the first switch 312, and the first capacitor 322, are configured in a boost configuration. Thus, the first inductor 320 is a common inductor that is used by the charging converter 310 for its various modes of operation. The first switch control 360 is configured to control the operation of charging converter 310 through control signals 362, 364, 366, 368 (individually referred to as a first control signal 362, a second control signal 364, a third control signal 366, and a fourth control signal 368). The operation of the charging converter 310 will be described with more detail below for various situations.

The system power converter 330 is coupled in a path between the first terminal 302 and the third terminal 306. As a result, the system power converter 330 is configured to generate the system voltage $V_{SYS}$ to power the internal system components of the electronic device. In some embodiments, the system power converter 330 may be coupled to an output of the charging converter 310. For example, the input line 345 to the system power converter 330 may be coupled to node 328 between the charging converter 310 and the rechargeable storage unit 380. In other words, the charging converter 310 and the system power converter 330 may be coupled in series. Thus, the configuration shown in FIG. 3A is similar to the general configuration shown in FIG. 2B. In some embodiments, the system power converter 330 may be coupled to an input of the charging converter 310, such as at the first terminal 302. For example, the input line 345 to the system power converter 330 may be coupled to the first terminal 302 rather than the node 328. In other words, the charging converter 310 and the system power converter 330 may be coupled in parallel. Such a configuration may be similar to the general configuration shown in FIG. 2A.

In some embodiments, the system power converter 330 includes a plurality of switches 332, 334 (referred to individually as a fifth switch 332 and a sixth switch 334). Each of the plurality of switches 332, 334 may be a transistor, such as a MOSFET, BJT, IGBT, or other device configured as a switch that is controllable by a control signal. The architecture of the power converter 300 may permit one or more of the plurality of switches 312, 314, 316, 318, 332, 334 to be relatively small to provide a relatively high current and a low $R_{DSon}$ resistance.

The system power converter 330 further includes a second inductor 336, and a capacitor 338 (also referred to as a third capacitor 338). The fifth switch 332, the sixth switch 334, the second inductor 336, and the third capacitor 338 are configured in a buck configuration. In some embodiments, the system power converter 330 may be further configured similar to the charging converter 310 such that the system power converter 330 is operable to step up or step down a voltage to generate the system voltage $V_{SYS}$. The operation of the charging converter 310 will be described with more detail below for various situations.

The system control 350 may be configured to determine what mode to operate each of the charging converter 310 and the system power converter 330, in response to the relative voltages of the system. In one embodiment, the system control 350 may sense voltages for the determination of the modes of operation. In another embodiment, the system control 350 may receive one or more signals that inform the system control 350 of certain voltage requirements. For example, when connected to the power source 190 (FIG. 1) through a USB connector, the power source 190 may send handshaking signals that communicate with the system control 350 to inform the system control of the available input voltage $V_{IN}$ prior to charging.

The power converter 300 may further include a current sense element 390 coupled in the path between the charging converter 310 and the second terminal 304. The current sense element may also be coupled in the path between the second terminal 304 and the third terminal 306. Current sense feedback signals 392, 394 may be coupled to the system control 350, which may be configured to determine the current flowing through the current sense element 390. The sensed current flowing through the current sense element 390 may be used to determine the presence of a short in the system, as will be described more fully with reference to FIG. 3G. The power converter 300 may further include a fourth capacitor 339 as an output capacitor.

While specific configurations of the power converter 300 are shown herein, embodiments of the present disclosure are not intended to be limited to such. Of course, additional circuit elements and configurations are contemplated that fall within the scope. For example, more or fewer switches may be used to implement the charging converter 310 and the system power converter 330.

Figure 3B:
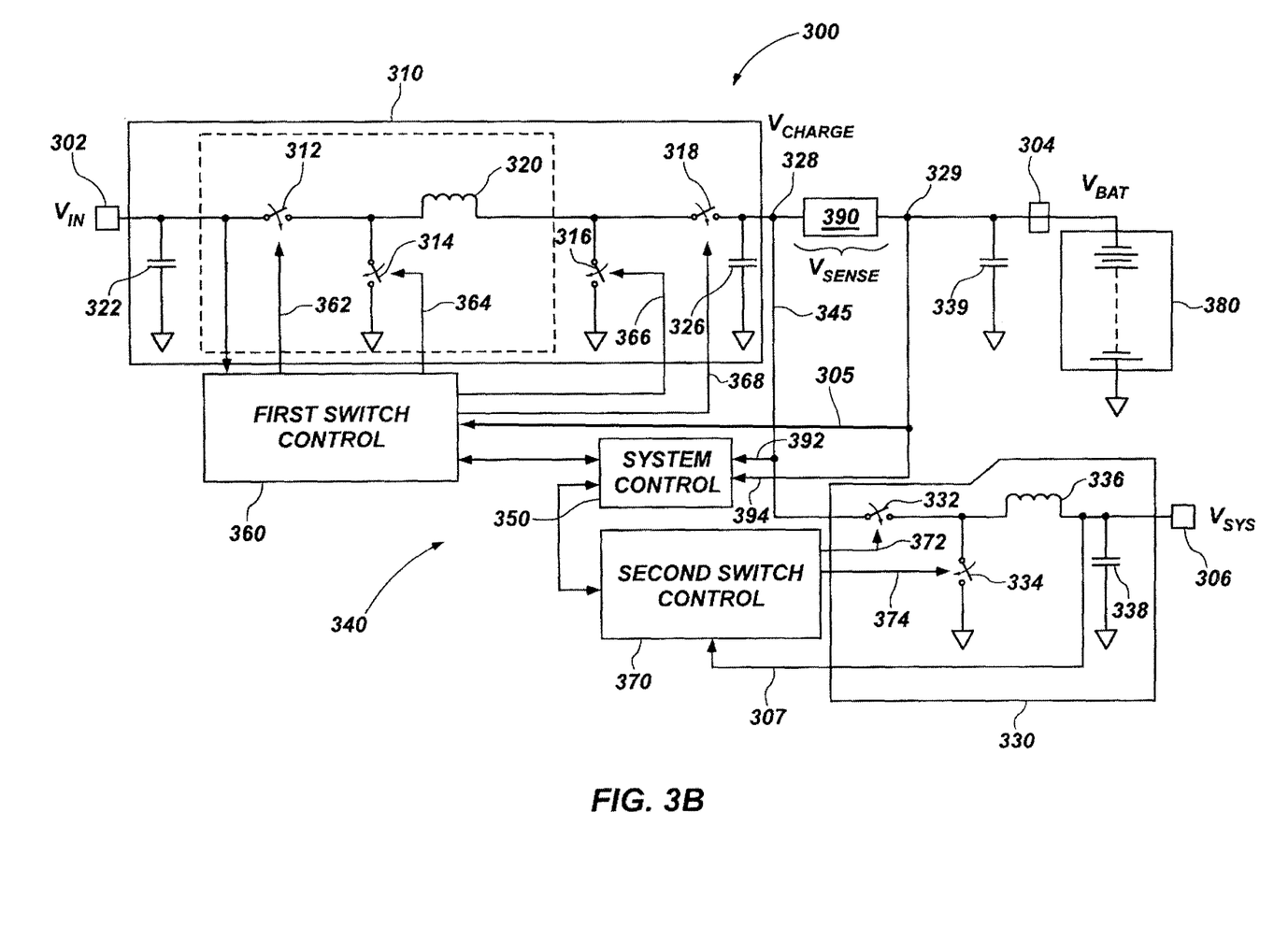

Referring specifically to FIG. 3B, the power converter 300 is configured to operate the charging converter 310 in a step-down (e.g., buck) mode to support charging the rechargeable storage unit 380, and operate the system power converter 330 in a step-down (e.g., buck) mode to support powering the internal system components 182 (FIG. 1). For example, the system logic 350 may determine that the input voltage $V_{IN}$ received to recharge the rechargeable storage unit 380 is relatively greater than the desired charging voltage $V_{CHARGE}$ needed to charge the rechargeable storage unit 380. In addition, the system logic 350 may determine that the desired charging voltage $V_{CHARGE}$ is also greater than the system voltage $V_{SYS}$ used to power the internal system components 182 (FIG. 1). For example, the input voltage $V_{IN}$ may be received from an adaptor that generates a voltage of 20 V, the rechargeable storage unit 380 may be a double cell lithium ion battery that has a desired charging voltage $V_{CHARGE}$ of 8.4 V, and the system voltage $V_{SYS}$ may be 3.3 V.

The system control 350 may cause the first switch control 360 to operate charging converter 310 in a step-down mode. For example, the plurality of control signals 362, 364, 366, and 368 may cause the first switch 312, the second switch 314, the first inductor 320, and the second capacitor 326 to operate in a manner to step down the input voltage $V_{IN}$ to generate the desired charging voltage $V_{CHARGE}$. As a result, the first switch 312 and the second switch 314 may be switched back and forth to open and close in an alternating manner (i.e., the first switch 312 is open while the second switch 314 is closed, and vice versa).

When the first switch 312 is closed, the second switch 314 is open, and the first inductor 320 and the second capacitor 326 are charged. When the first switch 312 is open, the second switch 314 is closed, and the energy in the first inductor 320 and the second capacitor 326 is discharged onto the load (e.g., rechargeable storage unit 380). The first switch control 360 determines the proper modulation, switching time, and frequency to generate the desired charging voltage $V_{CHARGE}$ for the rechargeable storage unit 380. For example, the first switch control 360 may receive a first feedback signal 305 such that the charging may operate in a closed loop and regulate the desired charging voltage $V_{CHARGE}$ to reach and maintain the desired voltage level.

While the first switch 312 and the second switch 314 operate in a step-down mode, the first switch control 360 holds the third switch 316 open and the fourth switch 318 closed, such that a continuous closed path exists between the charging converter 310 and the rechargeable storage unit 380.

The system control 350 may cause the second switch control 370 to operate the system power converter 330 in a step-down mode. For example, the plurality of control signals 372, 374 may cause the fifth switch 332, the sixth switch 334, the second inductor 336, and the third capacitor 338 to operate in a manner to step down the voltage at node 328 to generate the desired system voltage $V_{SYS}$. As a result, the fifth switch 332 and the sixth switch 334 may be switched back and forth to open and close in an alternating manner (i.e., the fifth switch 332 is open while the sixth switch 334 is closed, and vice versa).

When the fifth switch 332 is closed, the sixth switch 334 is open, and the second inductor 336 and the third capacitor 338 are charged. When the fifth switch 332 is open, the sixth switch 334 is closed, and the energy in the second inductor 336 and the third capacitor 338 is discharged onto the load (e.g., internal system components 182). The second switch control 370 determines the proper modulation, switching time, and frequency, to generate the desired system voltage $V_{SYS}$ for the internal system components 182. For example, the second switch control 370 may receive a second feedback signal 307 such that the charging may operate in a closed loop and regulate the desired system voltage $V_{SYS}$ to reach and maintain the desired voltage level. As a result, as the voltage at the node 328 is generated by the charging converter 310, the system power converter 330 generates the system voltage $V_{SYS}$ in response thereto.

With the charging voltage $V_{CHARGE}$ generated, if the voltage of the rechargeable storage unit 380 (i.e., battery voltage $V_{BAT}$) is below its full charging level, a differential voltage ($V_{SENSE}$) exists over the current sense element 390. As a result of the differential voltage $V_{SENSE}$, current flows into the rechargeable storage unit 380 to providing the charging. As the battery voltage $V_{BAT}$ increases to be equal to the charging voltage $V_{CHARGE}$, the differential voltage $V_{SENSE}$ is approximately zero, and no current flows into the rechargeable storage unit 180.

While charging the rechargeable storage unit 380, the battery voltage $V_{BAT}$ of the rechargeable storage unit 380 may be initially below a certain threshold (i.e., a termination voltage) for powering the internal system components 182. For example, a termination voltage for lithium ion batteries may be about 2.5 V, such that the battery may no longer provide enough power to the internal system components 182. As a result, the system control 350 may operate in different configurations while charging the rechargeable storage unit 380. For example, if the rechargeable storage unit 380 is below the termination voltage, the system control 350 may cause the power converter 300 to perform a trickle charge (e.g., low current mode) to the rechargeable storage unit 380 to initially bring the voltage above the terminal voltage. After the rechargeable storage unit 380 is charged above the terminal voltage, the system control 350 may be configured to charge the rechargeable storage unit 380 in a constant current (CC) mode. In a CC mode, the current passing through the current sense element 390 is held to be a constant value as the rechargeable storage unit 380 is charged. As a result, the charging voltage $V_{CHARGE}$ generated by the charging converter 310 may vary to provide a constant current. The current sense feedback signals 392, 394 may be used by the system control 350 to monitor the current provided to the rechargeable storage unit 380.

As the voltage on the rechargeable storage unit 380 passes another threshold (i.e., near full threshold), the system control 350 may operate in a constant voltage (CV) mode, such that the voltage generated by the charging converter 310 is held constant, while the current is automatically and gradually reduced until the voltage on the rechargeable storage unit 380 reaches its desired full voltage level.

Figure 3C:
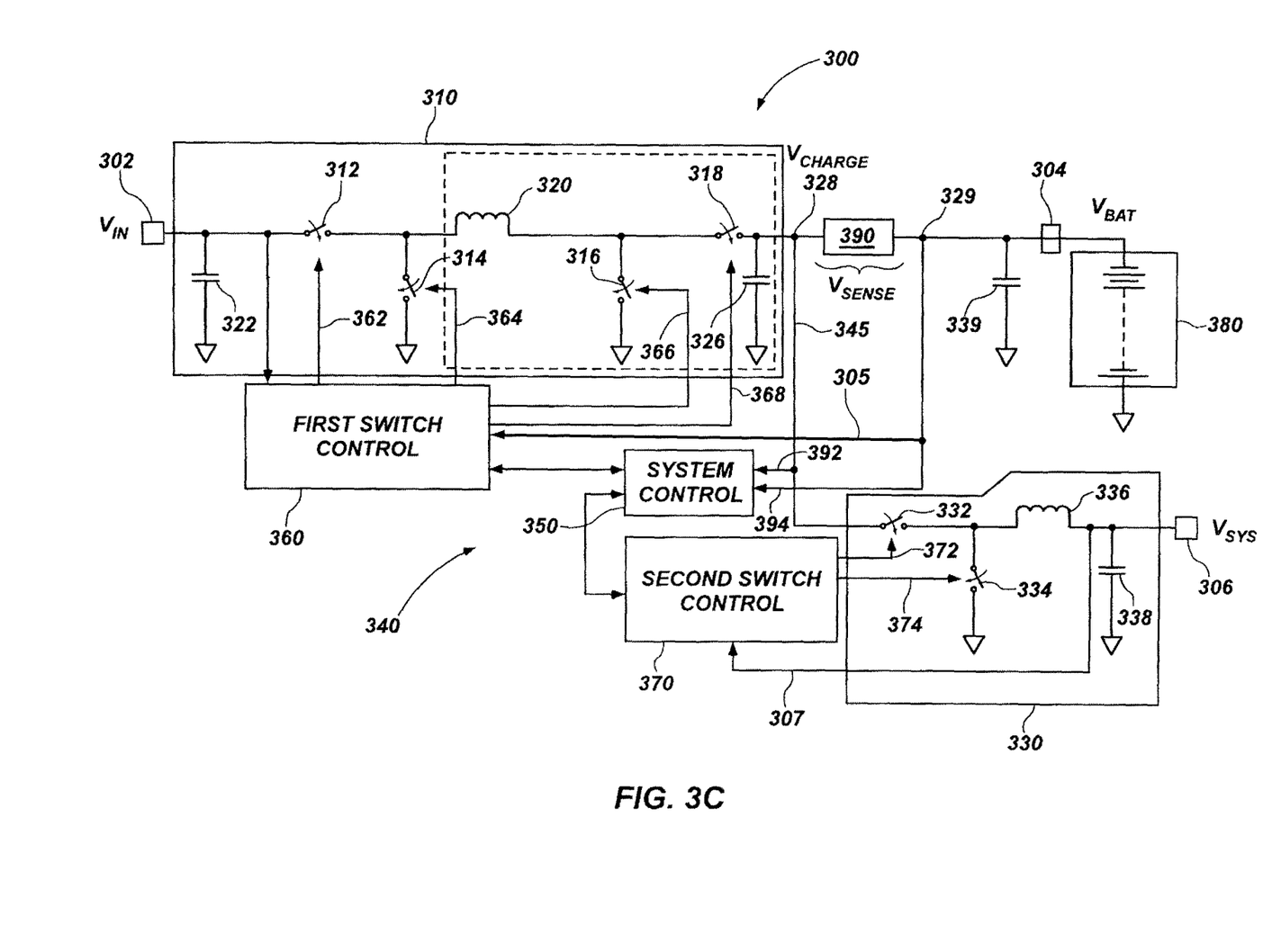

Referring specifically to FIG. 3C, the power converter 300 is configured to operate the charging converter 310 in a step-up (e.g., boost) mode, and the system power converter 330 in a step-down (e.g., buck) mode. For example, the system logic 350 may determine that the input voltage $V_{IN}$ received to recharge the rechargeable storage unit 380 is relatively lower than the desired charging voltage $V_{CHARGE}$ needed to charge the rechargeable storage unit 380. In addition, the system logic 350 may determine that the desired charging voltage $V_{CHARGE}$ is greater than the system voltage $V_{SYS}$ used to power the internal system components 182 (FIG. 1). For example, the input voltage $V_{IN}$ may be received from a USB connector that generates a voltage of 4.35 V, the rechargeable storage unit 380 may be a double cell lithium ion battery that has a desired charging voltage $V_{CHARGE}$ of 8.4 V, and the system voltage $V_{SYS}$ may be 3.3 V.

The combination of the first inductor 320, the second capacitor 326, the third switch 316, and the fourth switch 318 operates to step up the voltage (e.g., boost mode). In other words, the third switch 316 and the fourth switch 318 are switched back and forth in an alternating manner (i.e., the third switch 316 is open while the fourth switch 318 is closed, and vice versa). When the third switch 316 is closed, the fourth switch 318 is open, and the first inductor 320 and the second capacitor 326 are charged. When the third switch 316 is open, the fourth switch 318 is closed, and the energy in the first inductor 320 and the second capacitor 326 is discharged onto the load (e.g., rechargeable storage unit 380). The first switch control 360 determines the proper modulation, switching time, and frequency, to generate the desired charging voltage $V_{CHARGE}$ for the rechargeable storage unit 380. For example, the first switch control 360 may receive a first feedback signal 305 such that the charging may operate in a closed loop and regulate the desired charging voltage $V_{CHARGE}$ to reach and maintain the desired voltage level.

While the third switch 316 and the fourth switch 318 operate in a step-up mode, the first switch control 360 holds the first switch 312 closed and the second switch 314 open, such that a continuous closed path exists between the power source 190 (FIG. 1) and the charging converter 310.

The system control 350 may further determine that the charging voltage $V_{CHARGE}$ is greater than the desired system voltage $V_{SYS}$. As a result, the system control 350 may cause the second switch control 370 to operate the system power converter 330 in a step-down mode, as discussed above.

Figure 3D:
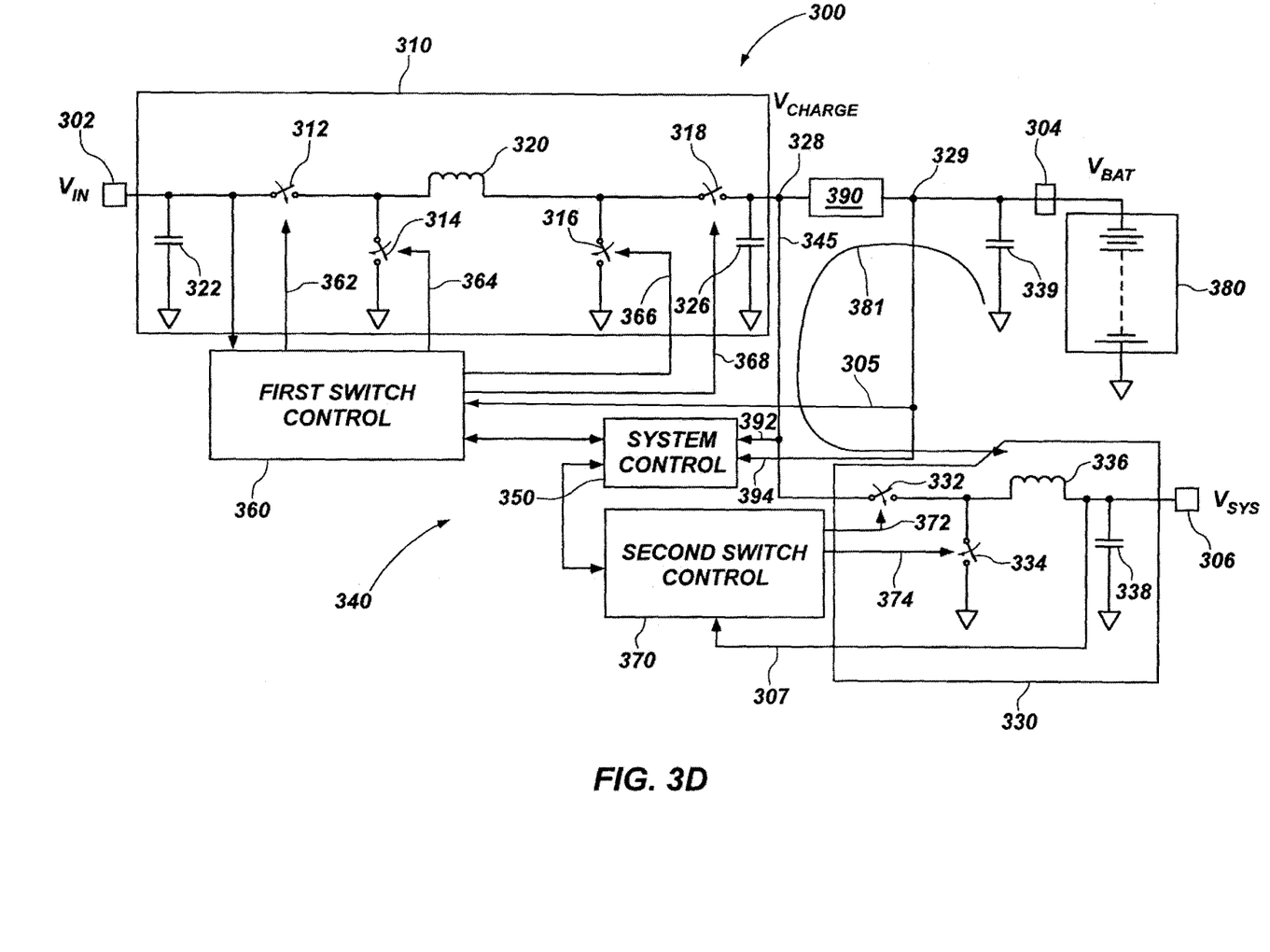

Referring specifically to FIG. 3D, in some situations the power converter 300 is configured to not operate the charging converter 310. For example, the system logic 350 may determine that there is no input voltage $V_{IN}$ received, such that the rechargeable storage unit 380 is not to be recharged. For example, the electronic device may simply be in operational mode without being coupled with the external power source 190 (FIG. 1) recharging the rechargeable storage unit 380. In such a mode, the power converter 300 may only be providing power to operate the internal system components 182 (FIG. 1), and current 381 may flow from the rechargeable storage unit 380 to the internal system components 182. In addition, it may not be required for the charging converter 310 to perform its functionality. As a result, the system control 350 may cause the first switch control 360 to hold the first switch 312, the second switch 314, the third switch 316, and the fourth switch 318 open, such that a current path between the first terminal 302 and either the second terminal 304 or the third terminal 306 does not exist.

The system logic 350 may determine that the voltage of the rechargeable storage unit 380 may be greater than the system voltage $V_{SYS}$ used to power the internal system components 182. For example, the rechargeable storage unit 380 may be a double cell lithium ion battery that has a full battery voltage of 8.4 V, and the system voltage $V_{SYS}$ may be 3.3 V. As a result, the system control 350 may cause the second switch control 370 to operate the system power converter 330 in a step-down mode, as discussed above. The rechargeable storage unit 380 may not necessarily be fully charged, such that the voltage of the rechargeable storage unit 380 may be less than 8.4 V.

As discussed above, in some embodiments, the system power converter 330 may be coupled in parallel to the charging converter 310 such that the input line 345 may be coupled to the first terminal 302. In such an embodiment, when the rechargeable storage unit 380 powers the internal system components 182 (FIG. 1), the current 381 would need a path through the charging converter 310 to the system power converter 330. As a result, the first switch control 360 may hold the first switch 312 and the fourth switch 318 closed, and the second switch 314 and the third switch 316 open. In such an embodiment, the power converter 300 may be more lossy as the current 331 may pass through the first switch 312 and the fourth switch 318 and experience additional impedance.

Figure 3E:
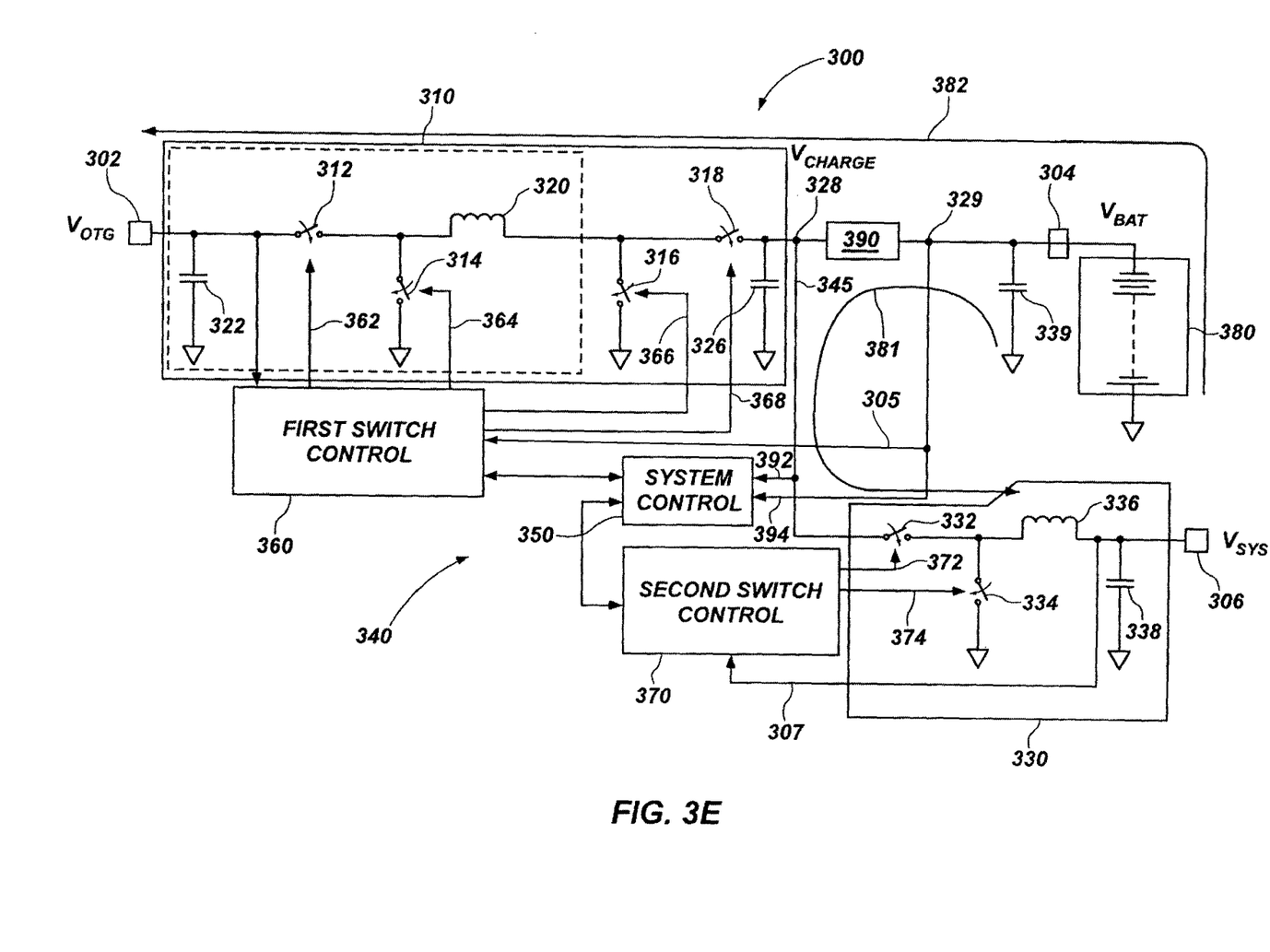

Referring specifically to FIG. 3E, the power converter 300 is shown to operate in an OTG mode in which the power converter 300 is coupled to an external electronic device (e.g., second electronic device 101B in FIG. 1). In other words, the first electronic device 101A may be configured to act as a power source for the second electronic device 101B. As a result, the charging converter 310 may receive the voltage at node 328 (labeled still as $V_{CHARGE}$ for convenience) and generate the OTG voltage in response thereto. Thus, the charging converter 310 may be configured to operate in reverse order as in the charging modes described above.

The system control 350 may determine that the charging voltage $V_{CHARGE}$ is relatively lower than the desired OTG voltage. As an example, the rechargeable storage unit 380 may be a single cell lithium ion battery having a full battery voltage of 4.2 V, while the OTG voltage may be desired to be 5 V. As a result, the first switch control 360 controls the charging converter 310 to operate in boost mode. Thus, as the current 382 passes through the charging converter 310, the charging converter 310 may step up the voltage to generate the desired OTG voltage.

In operation, the first switch control 360 may hold the fourth switch 318 closed and the third switch 316 open to provide a path for the current 382 from the rechargeable storage unit 380 to the first terminal 302 in order to provide power to the second electronic device 101B coupled thereto. The first switch 312 and the second switch 314 operate in an alternating manner in order to charge and discharge the first inductor 320 and the first capacitor 322 to generate the OTG voltage. As a result, the second electronic device 101B may be charged by the first electronic device 101A.

During OTG mode, the rechargeable storage unit 380 may support and provide the system voltage $V_{SYS}$ to the internal system components 182 (FIG. 1). Thus, the current 381 may flow through the system power converter 330, which may operate as previously described herein.

Figure 3F:
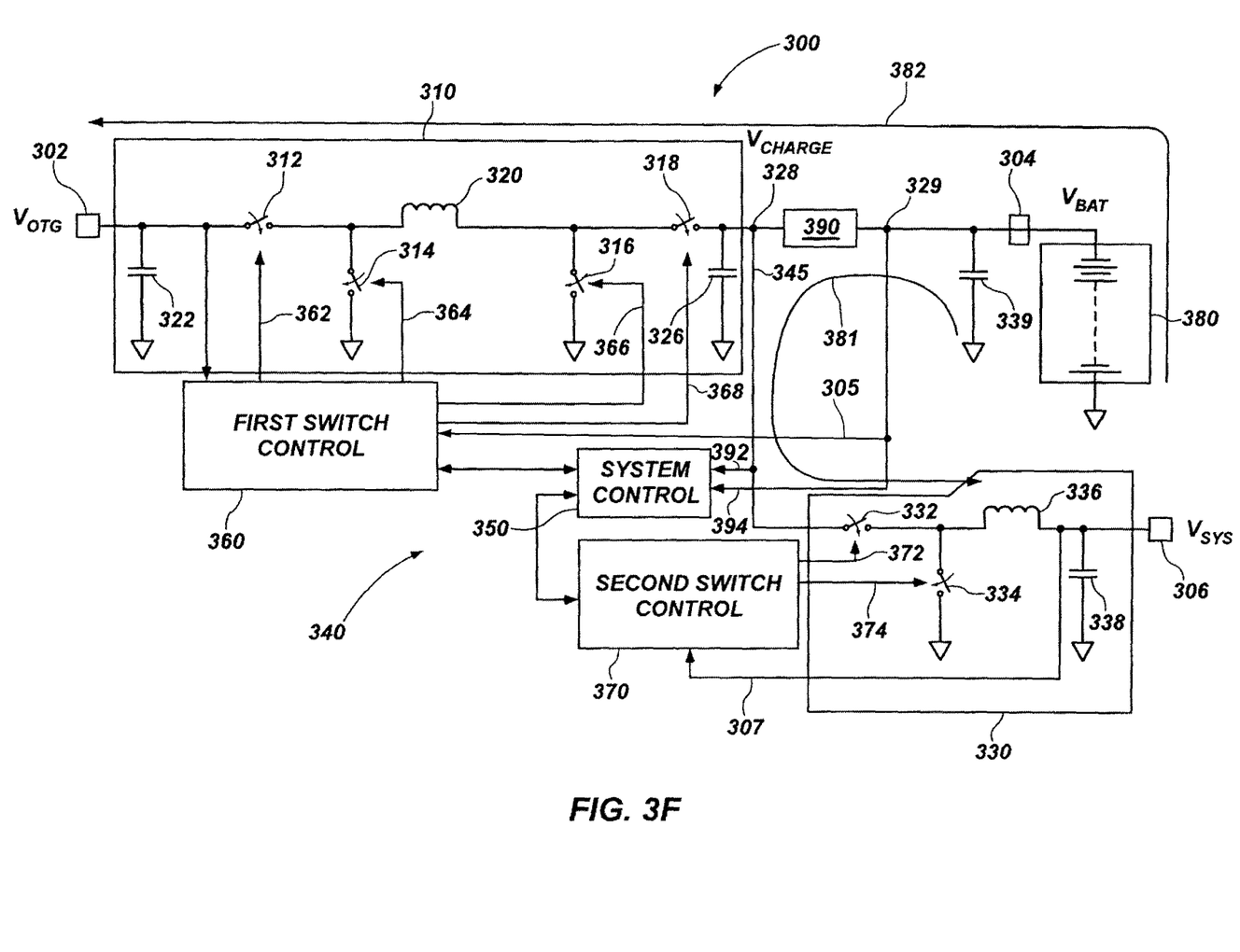

Referring specifically to FIG. 3F, the power converter 300 is shown to operate in an OTG mode, in which the charging converter 310 operates in a step-down mode. For example, the system control 350 may determine that the charging voltage $V_{CHARGE}$ is relatively higher than the desired OTG voltage. As an example, the rechargeable storage unit 380 may be a double cell lithium ion battery having a full battery voltage of 8.4 V, while the OTG voltage may be desired to be 5 V. As a result, the first switch control 360 controls the charging converter 310 to operate in step-down mode. Thus, as the current 382 passes through the charging converter 310, the charging converter 310 may step down the voltage to generate the desired OTG voltage.

In operation, the first switch control 360 may hold the first switch 312 closed and the second switch 314 open to provide a path for the current 382 from the rechargeable storage unit 380 to the first terminal 302 in order to provide power to the second electronic device 101B coupled thereto. The third switch 316 and the fourth switch 318 operate in an alternating manner in order to charge and discharge the first inductor 320 and the first capacitor 322 to generate the OTG voltage. As a result, the second electronic device 101B may be charged by the first electronic device 101A.

During OTG mode, the rechargeable storage unit 380 may support and provide the system voltage $V_{SYS}$ to the internal system components 182 (FIG. 1). Thus, the current 381 may flow through the system power converter 330, which may operate as previously described herein.

Figure 3G:
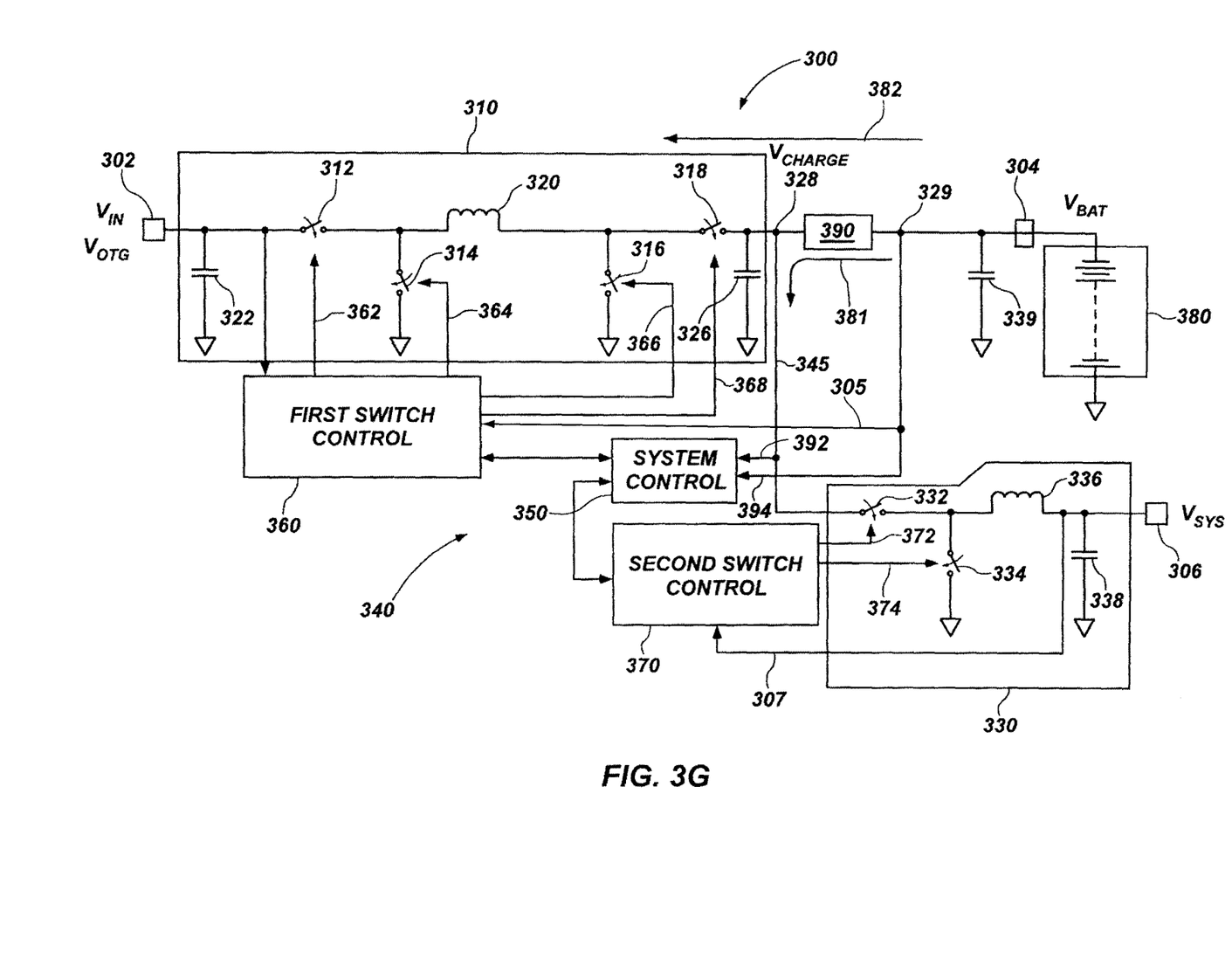

Referring specifically to FIG. 3G, the power converter 300 may be configured to be operated in a protection mode. For example, in one situation the first terminal 302 (i.e., input) may be shorted to ground. In another situation, a component within the internal system components 182 may be shorted (e.g., through a component failure). As a result, the rechargeable storage unit 380 may have a path to ground that causes charge leakage, excess heat, or other problems.

The system control 350 may monitor the current flowing through the current sense element 390 through current sense feedback signals 392, 394. If the current flowing through the current sense element 390 exceeds a pre-determined threshold, the protection mode may be initiated by the system control 350.

In one embodiment, if the current 382 exceeds the pre-determined threshold indicating that a short exists at the first terminal 302, the first switch control 360 may hold the first switch 312, the fourth switch 318, or both, open such that a current path from the rechargeable storage unit 380 to the first terminal 302 may not exist. If the current 381 exceeds the pre-determined threshold indicating that a short exists within the internal system components 182, the second switch control 370 may hold the fifth switch 332 open such that a current path from the rechargeable storage unit 380 to the internal system components 182 may not exist. The system control 350 may distinguish between a short at the first terminal 302 or the internal system components 182, such as through a plurality of current sense elements (not shown) or other methods. In other embodiments, the system control 350 may not attempt to distinguish between a short at the first terminal 302 or the internal system components 182, and may simply determine that the current flowing through the current sense element 390 exceeds a pre-determined threshold, and the system control 350 may cause the first switch 312, the fourth switch 318, and the fifth switch 332 open, or any combination thereof.

As additional embodiments may include different numbers and configurations of switches, the operation of the protection mode should not be limited to those specifically described herein. A short at the first terminal 302 or the internal system components 182 may cause the system control 350 to open one or more switches of the charging converter 310, the system power converter 330, or a combination thereof.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A power converter, comprising:
   a first terminal configured to receive an input voltage;
   a charging converter coupled in a current path from the first terminal to a second terminal and including a first switch and configured to:
      provide power from a power source to a rechargeable storage unit that is internal to the power converter during a charging mode; and
      provide power from the rechargeable storage unit to an external electronic device that is externally connected to the power converter during an on-the-go mode;
   a system power converter coupled in a current path from the second terminal to a third terminal, the system power converter including a second switch and configured to:
      provide power to internal system components of the power converter from the rechargeable storage unit and an input power source; and
   control logic coupled to the charging converter and the system power converter and configured to control the charging converter and the system power converter by:
      determining whether a short exists;
      distinguishing whether the short exists at the first terminal or the third terminal using a current sensor;
      in response to detecting a short at the first terminal, causing the charging converter to open the first switch; and
      in response to detecting a short at the third terminal, causing the system power converter to open the second switch.

2. The power converter of claim 1, further comprising:
   an inductor, a capacitor, a third switch, a fourth switch, a fifth switch, and a sixth switch;
   wherein the third switch, the fourth switch, the inductor, and the capacitor are configured in a buck configuration and the inductor, the capacitor, the fifth switch, and the sixth switch are configured in a boost configuration.

3. The power converter of claim 1, wherein the current sensor is configured to provide current sense feedback signals into the control logic.

4. The power converter of claim 1, wherein the control logic is further configured to control the charging converter to charge the rechargeable storage unit in at least one of a constant current mode and a constant voltage mode.

5. An electronic device, comprising:
first, second, and third terminals;
a charging converter coupled in a current path from the first terminal to the second terminal, the charging converter including a first switch and configured to:
provide power from a power source to a rechargeable storage unit that is internal to the electronic device during a charging mode;
provide power from the rechargeable storage unit to an external electronic device that is externally connected to the electronic device during an on-the-go mode; and
a system power converter coupled in a current path from the second terminal to the third terminal, the system power converter including a second switch and configured to:
provide power to internal system components of the electronic device from at least one of the rechargeable storage unit and an input power source; and
control logic coupled to the charging converter and the system power converter and configured to control the charging converter and the system power converter by:
determining whether a short exists;
distinguishing whether the short exists at the first terminal or the third terminal using a current sensor;
in response to detecting a short at the first terminal, causing the charging converter to open the first switch; and
in response to detecting a short at the third terminal, causing the system power converter to open the second switch.

6. The electronic device of claim 5, wherein the system power converter is coupled to an output of the charging converter and is in series with the charging converter.

7. The electronic device of claim 5, wherein the system power converter is coupled to the first terminal and is in parallel with the charging converter to receive input power from the power source.

8. The electronic device of claim 5, wherein the rechargeable storage unit is selected from a group consisting of a single cell battery and a multiple cell battery.

9. The electronic device of claim 5, wherein each of the charging mode and the on-the-go mode includes a step-up mode and a step-down mode.

10. The electronic device of claim 5, wherein the control logic is further configured to control the system power converter to switchably operate in a step-down mode in response to a determination of a voltage received by the system power converter relative to a desired system voltage.

11. The electronic device of claim 5, wherein the charging converter includes:
a first plurality of switches configured in a buck configuration with an inductor and a capacitor; and
a second plurality of switches configured in a boost configuration with the inductor and the capacitor.

12. The electronic device of claim 5, further including a wireless power receiver, and wherein the power source includes a wireless power charger configured to provide a power signal through inductive coupling.

13. The electronic device of claim 5, wherein the charging converter is configured to provide power from the rechargeable storage unit to the external electronic device through a same connection that the power source uses when connected to the first terminal.

14. The electronic device of claim 5, wherein each of the electronic device and the external electronic device is selected from the group consisting of a laptop, a notebook, a tablet, an electronic reader, a cellular phone, a smart phone, a personal digital assistant, and a media player.

15. A method for operating a rechargeable storage unit of an electronic device, the method comprising:
charging a rechargeable storage unit housed within the electronic device through a charging converter responsive to receiving an input voltage provided by an external power source through a first terminal during a charging mode, the charging converter coupled in a current path from the first terminal to a second terminal and including a first switch;
providing power, by the charging converter, from the rechargeable storage unit to an external electronic device that is externally connected to the electronic device during an on-the-go mode;
providing power, by a system power converter coupled in a current path from the second terminal to a third terminal, to internal system components of the electronic device from the rechargeable storage unit and an input power source, the system power converter including a second switch;
controlling, by control logic, the charging converter and the system power converter coupled to the control logic;
determining whether a short exists using a current sensor;
determining whether the short exists at the first terminal or the third terminal;
in response to detecting a short at the first terminal, causing the charging converter to open the first switch; and
in response to detecting a short at the third terminal, causing the system power converter to open the second switch.

16. The method of claim 15, further comprising switchably controlling, by the control logic, the system power converter to perform a step down function on a charging voltage to power internal system components during charging of the rechargeable storage unit.

17. The method of claim 16, further comprising providing, by the rechargeable storage unit, power to the internal system components through the system power converter when no input voltage is provided by the external power source.

18. The method of claim 16, further comprising sensing, by the current sensor, current flowing from the rechargeable storage unit to ground.

19. The method of claim 15, wherein providing power, by the charging converter, during the on-the-go mode comprises:
determining another desired charging voltage to charge the external electronic device;
switchably controlling the charging converter to step up a voltage from the rechargeable storage unit in response to the voltage being lower than the another desired charging voltage to generate another charging voltage to the external electronic device; and
switchably controlling the charging converter to step down the voltage from the rechargeable storage unit in response to the voltage being higher than the another desired charging voltage to generate the another charging voltage to the external electronic device.

20. The method of claim 15, wherein receiving an input voltage provided by a power source includes receiving an input voltage from a power source through coupling selected from the group consisting of wired connection coupling and wireless power coupling.

21. The method of claim 20, wherein the wired connection coupling includes at least one of an AC/DC adaptor and a universal serial bus connector.

22. The method of claim 15, wherein charging a rechargeable storage unit during a charging mode comprises:
   determining a desired charging voltage to charge the rechargeable storage unit;
   switchably controlling the charging converter to step up the input voltage in response to the input voltage being lower than the desired charging voltage to generate a charging voltage; and
   switchably controlling the charging converter to step down the input voltage in response to the input voltage being higher than the desired charging voltage to generate the charging voltage.

* * * * *